(12) United States Patent
Jiang et al.

(10) Patent No.: US 10,965,565 B2
(45) Date of Patent: Mar. 30, 2021

(54) METHOD AND APPARATUS FOR MONITORING BANDWIDTH CONDITION

(71) Applicant: WANGSU SCIENCE & TECHNOLOGY CO., LTD., Shanghai (CN)

(72) Inventors: Longwei Jiang, Shanghai (CN); Dongjie Xia, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/959,128

(22) PCT Filed: Nov. 2, 2018

(86) PCT No.: PCT/CN2018/113734
§ 371 (c)(1),
(2) Date: Jun. 29, 2020

(87) PCT Pub. No.: WO2020/062439
PCT Pub. Date: Apr. 2, 2020

(65) Prior Publication Data
US 2020/0366583 A1 Nov. 19, 2020

(30) Foreign Application Priority Data

Sep. 30, 2018 (CN) .......................... 201811160633.3

(51) Int. Cl.
*G06F 15/173* (2006.01)
*H04L 12/26* (2006.01)
*H04L 29/12* (2006.01)

(52) U.S. Cl.
CPC .......... *H04L 43/08* (2013.01); *H04L 61/3025* (2013.01)

(58) Field of Classification Search
CPC . H04L 43/08; H04L 61/3025; H04L 41/5019; H04L 41/142; H04L 43/12; H04L 43/0894; H04L 67/00
(Continued)

(56) References Cited

U.S. PATENT DOCUMENTS 9,350,616 B1 * 5/2016 Lou .......................... H04L 47/12
2012/0307654 A1 * 12/2012 Pantos .................. H04L 47/283
370/252

(Continued)

FOREIGN PATENT DOCUMENTS

CN 101651568 A 2/2010
CN 102271068 A 12/2011
(Continued)

OTHER PUBLICATIONS

The World Intellectual Property Organization (WIPO) International Search Report for PCT/CN2018/113734 dated Jun. 17, 2019 5 pages.
(Continued)

*Primary Examiner* — Johnny B Aguiar
(74) *Attorney, Agent, or Firm* — Anova Law Group, PLLC

(57) ABSTRACT

A method and an apparatus for monitoring bandwidth condition are provided. The method includes: determining a monitoring reference period of bandwidth data of a target
(Continued)

domain name every preset monitoring interval duration; obtaining bandwidth-data average values of the target domain name in the monitoring reference period during a current statistical cycle and a plurality of historical statistical cycles; determining, according to the bandwidth-data average values and a preset confidence level, a bandwidth dynamic interval corresponding to the monitoring reference period; and monitoring, according to current bandwidth data of the target domain name and the bandwidth dynamic interval, a current bandwidth condition of the target domain name. Using the disclosed method and apparatus is able to detect abnormal bandwidth condition in time, which is conducive to repairing the abnormal condition before the service provider detects the bandwidth anomaly, and thus ensures the overall service quality of the client.

13 Claims, 4 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2013/0007263 | A1* | 1/2013 | Soroushian ............ H04L 65/607 |
| | | | 709/224 |
| 2016/0277264 | A1 | 9/2016 | Zarn |
| 2016/0357935 | A1 | 12/2016 | Pottala et al. |
| 2019/0372857 | A1* | 12/2019 | Gandhi ................ H04L 41/0826 |

FOREIGN PATENT DOCUMENTS

| | | |
|---|---|---|
| CN | 104732762 A | 6/2015 |
| CN | 104954192 A | 9/2015 |
| CN | 105530219 A | 4/2016 |
| CN | 106027288 A | 10/2016 |

OTHER PUBLICATIONS

The China National Intelleectual Property Administration (CNIPA) The China Search Report for 201811160633.3 dated Feb. 6 2020 5 Pages.

* cited by examiner

METHOD AND APPARATUS FOR MONITORING BANDWIDTH CONDITION

CROSS-REFERENCE TO RELATED APPLICATIONS

This application is a national phase entry under 35 U.S.C. § 371 of International Application No. PCT/CN2018/113734, filed on Nov. 2, 2018, which claims the priority and benefits of Chinese Patent Application Serial No. CN201811160633.3, filed with the State Intellectual Property Office of P. R. China on Sep. 30, 2018, the entire content of all of which is incorporated herein by reference.

FIELD OF THE DISCLOSURE

The present disclosure relates to the field of network communication technology and, more particularly, relates to a method and an apparatus for monitoring bandwidth condition.

BACKGROUND

In order to improve the feedback speed in response to user access and also ensure the stability and high availability of the service back-end system, most service providers use a content delivery network (CDN) acceleration service to implement the related service. From the perspective of CDN providers, the CDN providers often allocate CDN bandwidth resources for each CDN acceleration service subscriber (can be called a client) to implement the CDN acceleration service.

Due to user demand updates and device status changes, it is often difficult to determine changes in client's bandwidth. On the one hand, in a case when user's demands suddenly increase, the client's bandwidth will suddenly increase, and the load of the CDN node that provides the corresponding acceleration service may increase dramatically and even enter an overload state, thereby affecting the service quality. On the other hand, when the client's bandwidth suddenly reduces, the corresponding CDN node has a high probability of failure. When the failure cannot be repaired in time, the service quality will be greatly reduced, and will even cause a large loss of users. Therefore, there is a need to provide a method for effectively monitoring sudden changes in the bandwidth of the CDN acceleration service, such that when the CDN node is in an overload or fault state, the CDN provider can detect and process accordingly in time to ensure the overall service quality of the client.

BRIEF SUMMARY OF THE DISCLOSURE

In order to solve the problems in the prior art, embodiments of the present disclosure provide a method and an apparatus for monitoring bandwidth condition. The technical solution is as follows.

In a first aspect, a method for monitoring bandwidth condition is provided, and the method includes:
  determining a monitoring reference period of bandwidth data of a target domain name every preset monitoring interval duration;
  obtaining bandwidth-data average values of the target domain name in the monitoring reference period during a current statistical cycle and a plurality of historical statistical cycles;
  determining, according to the bandwidth-data average values and a preset confidence level, a bandwidth dynamic interval corresponding to the monitoring reference period; and
  monitoring, according to the current bandwidth data of the target domain name and the bandwidth dynamic interval, a current bandwidth condition of the target domain name.

Optionally, obtaining the bandwidth-data average values of the target domain name in the monitoring reference period during the current statistical cycle and the plurality of historical statistical cycles includes:
  obtaining real-time bandwidth data of the target domain name at each specified collection time in the monitoring reference period during the current statistical cycle;
  calculating and storing, according to the real-time bandwidth data, a bandwidth-data average value of the target domain name in the monitoring reference period; and
  obtaining pre-stored bandwidth-data average values of the target domain name in the monitoring reference period during the plurality of historical statistical cycles.

Optionally, calculating and storing, according to the real-time bandwidth data, the bandwidth-data average value of the target domain name in the monitoring reference period includes:
  calculating, according to the real-time bandwidth data, a bandwidth-data average value and a bandwidth-data standard deviation of the target domain name in the monitoring reference period;
  determining, according to the bandwidth-data average value, the bandwidth-data standard deviation, and a preset bandwidth fluctuation weight, a bandwidth fluctuation range of the target domain name;
  removing, from the real-time bandwidth data of the target domain name in the monitoring reference period, real-time bandwidth data having a value outside the bandwidth fluctuation range; and
  recalculating and storing, according to remaining real-time bandwidth data after the removal, a bandwidth-data average value of the target domain name in the monitoring reference period.

Optionally, recalculating and storing, according to remaining real-time bandwidth data after the removal, a bandwidth-data average value of the target domain name in the monitoring reference period further includes:
  recalculating and storing, according to the remaining real-time bandwidth data after the removal and a preset time weight corresponding to each of the real-time bandwidth data, the bandwidth-data average value of the target domain name in the monitoring reference period.

Optionally, determining, according to the bandwidth-data average values and the preset confidence level, the bandwidth dynamic interval corresponding to the monitoring reference period includes:
  calculating an average value and a standard deviation of a plurality of bandwidth-data average values of the target domain name corresponding to the current statistical cycle and the plurality of historical statistical cycles;
  determining, according to the average value and the standard deviation of the plurality of bandwidth-data average values and a preset average-value fluctuation weight, a fluctuation range of the average value of the target domain name;

removing, from the plurality of bandwidth-data average values in the monitoring reference period, bandwidth-data average values outside the fluctuation range of the average value; and determining, according to remaining bandwidth-data average values after the removal and the preset confidence level, the bandwidth dynamic interval corresponding to the monitoring reference period.

Optionally, determining, according to the remaining bandwidth-data average values after the removal and the preset confidence level, the bandwidth dynamic interval corresponding to the monitoring reference period includes:

determining, according to the remaining bandwidth-data average values after the removal, a preset cycle weight corresponding to each bandwidth-data average value, and the preset confidence level, the bandwidth dynamic interval corresponding to the monitoring reference period.

Optionally, prior to obtaining the bandwidth-data average values of the target domain name in the monitoring reference period during the current statistical cycle and the plurality of historical statistical cycles, the method includes:

determining a plurality of historical statistical cycles that have a cycle type the same as the cycle type of the current statistical cycle and are also the closest to the current statistical cycle.

In a second aspect, an apparatus for monitoring bandwidth condition is provided, and the apparatus includes:

a first determination module, configured to determine a monitoring reference period of the bandwidth data of a target domain name every preset monitoring interval duration;

an acquisition module, configured to obtain bandwidth-data average values of the target domain name in the monitoring reference period during a current statistical cycle and a plurality of historical statistical cycles;

a second determination module, configured to determine, according to the bandwidth-data average values and a preset confidence level, a bandwidth dynamic interval corresponding to the monitoring reference period; and a monitoring module, configured to monitor, according to the current bandwidth data of the target domain name and the bandwidth dynamic interval, a current bandwidth condition of the target domain name.

Optionally, the acquisition module is specifically configured to:

obtain real-time bandwidth data of the target domain name at each specified collection time in the monitoring reference period during the current statistical cycle;

calculate and store, according to the real-time bandwidth data, a bandwidth-data average value of the target domain name in the monitoring reference period; and obtain pre-stored bandwidth-data average values of the target domain name in the monitoring reference period during the plurality of historical statistical cycles.

Optionally, the acquisition module is specifically configured to:

calculate, according to the real-time bandwidth data, a bandwidth-data average value and a bandwidth-data standard deviation of the target domain name in the monitoring reference period;

determine, according to the bandwidth-data average value, the bandwidth-data standard deviation, and a preset bandwidth fluctuation weight, a bandwidth fluctuation range of the target domain name;

remove, from the real-time bandwidth data of the target domain name in the monitoring reference period, real-time bandwidth data having a value outside the bandwidth fluctuation range; and recalculate and store, according to remaining real-time bandwidth data after the removal, a bandwidth-data average value of the target domain name in the monitoring reference period.

Optionally, the acquisition module is further configured to:

recalculate and store, according to the remaining real-time bandwidth data after the removal and a preset time weight corresponding to each of the real-time bandwidth data, the bandwidth-data average value of the target domain name in the monitoring reference period.

Optionally, the second determination module is specifically configured to:

calculate an average value and a standard deviation of a plurality of bandwidth-data average values of the target domain name corresponding to the current statistical cycle and the plurality of historical statistical cycles;

determine, according to the average value and the standard deviation of the plurality of bandwidth-data average values and a preset average-value fluctuation weight, a fluctuation range of the average value of the target domain name;

remove, from the plurality of bandwidth-data average values in the monitoring reference period, bandwidth-data average values outside the fluctuation range of the average value; and determine, according to remaining bandwidth-data average values after the removal and the preset confidence level, the bandwidth dynamic interval corresponding to the monitoring reference period.

Optionally, the second determination module is specifically configured to:

determine, according to the remaining bandwidth-data average values after the removal, a preset cycle weight corresponding to each bandwidth-data average value, and the preset confidence level, the bandwidth dynamic interval corresponding to the monitoring reference period.

Optionally, the apparatus further includes a third determination module, configured to:

determine a plurality of historical statistical cycles that have a cycle type the same as the cycle type of the current statistical cycle and are also the closest to the current statistical cycle.

In a third aspect, a bandwidth monitoring device is provided. The bandwidth monitoring device includes a processor and a memory. At least one instruction, at least one program, a code collection, or an instruction collection is stored in the memory. The at least one instruction, the at least one program, the code collection, or the instruction collection is loaded and executed by the processor to implement the method for monitoring bandwidth condition according to the first aspect.

In a fourth aspect, a computer readable storage medium is provided. At least one instruction, at least one program, a code collection, or an instruction collection is stored in the storage medium, and the at least one instruction, the at least one program, the code collection, or the instruction collection is loaded and executed by the processor to implement the method for monitoring bandwidth condition according to the first aspect.

The beneficial effects brought by the technical solutions provided by the embodiments of the present disclosure may include the following.

In the embodiments of the present disclosure, a monitoring reference period of the bandwidth data of the target domain name is determined every preset monitoring interval duration; the bandwidth-data average values of the target domain name in the monitoring reference period during a current statistical cycle and a plurality of historical statistical cycles are obtained; according to the bandwidth-data average values and a preset confidence level, a bandwidth dynamic interval corresponding to the monitoring reference period is determined; and according to the current bandwidth data and the bandwidth dynamic interval of the target domain name, the bandwidth condition of the current target domain is monitored. As such, when monitoring bandwidth condition, by analyzing the historical bandwidth data, a reasonable bandwidth dynamic interval is determined, such that before an abnormal bandwidth condition is accumulated to affect the service quality, the abnormal bandwidth condition can be detected in time through the bandwidth dynamic interval, and a subsequent alarm or repair process can be triggered, which is conducive to repairing the abnormal condition before the service provider detects the bandwidth anomaly, and thus ensures the overall service quality for the client.

BRIEF DESCRIPTION OF THE DRAWINGS

In order to more clearly illustrate the technical schemes in the embodiments of the present disclosure, the drawings used in the description of the embodiments will be briefly described below. It is obvious that the drawings in the following description are only some embodiments of the present disclosure, and for those of ordinary skill in the art, other drawings may also be obtained from these drawings without paying for any creative effort.

DETAILED DESCRIPTION

In order to make the objects, technical solutions and advantages of the present disclosure clearer, the embodiments of the present disclosure will be further described in detail below with reference to the accompanying drawings.

Figure 1:
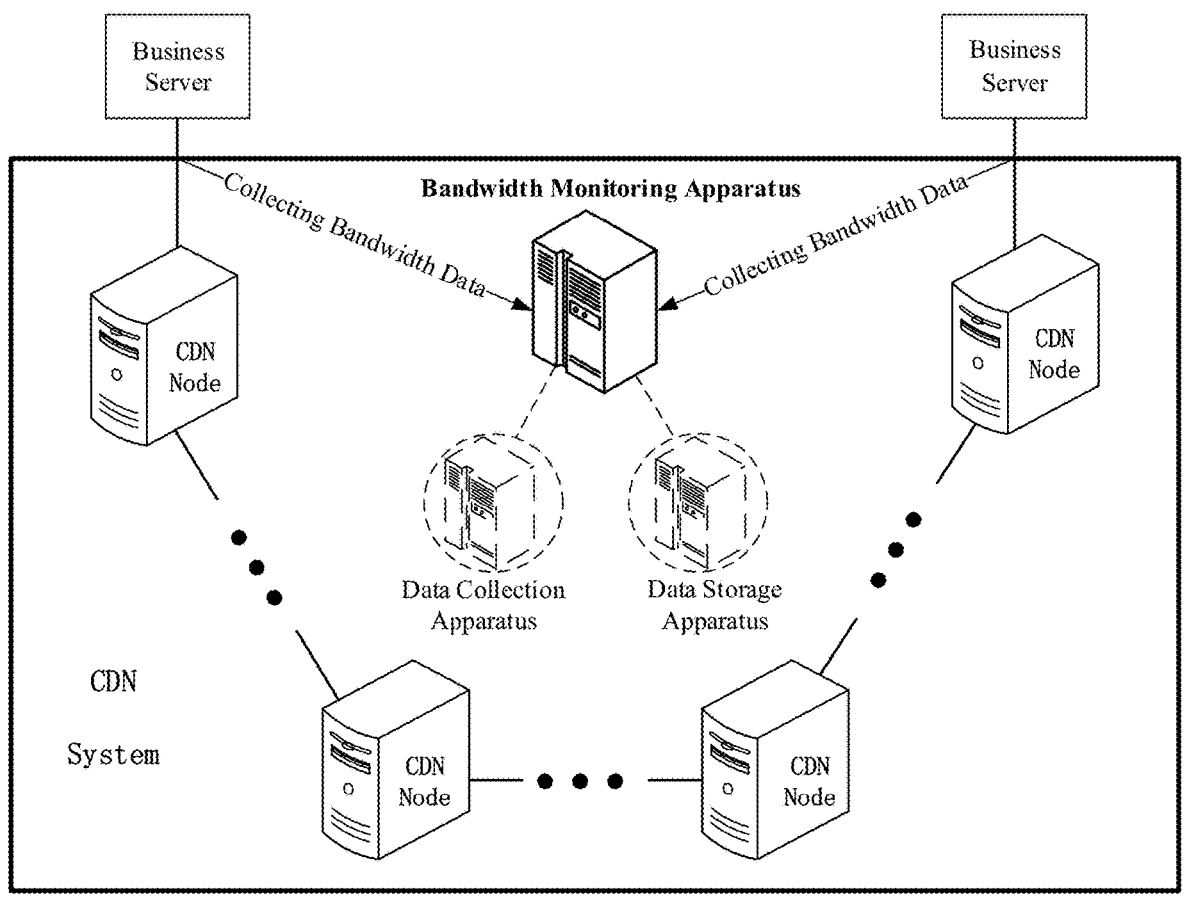
FIG. 1 illustrates a schematic diagram of a scenario architecture of a CDN system according to an embodiment of the present disclosure.

The embodiments of the present disclosure provide a method for monitoring bandwidth condition. The method may be applied to a CDN system, and may be specifically implemented by a bandwidth monitoring device in the CDN system. The bandwidth monitoring device may be a device in the CDN system for monitoring the bandwidth condition of a client who subscribes the CDN acceleration service, and may monitor the bandwidth condition of the client by acquiring the bandwidth data of the client and raise a bandwidth-anomaly alarm or trigger a preset anomaly-handling process based on the monitoring result. The collection and the storage of the bandwidth data of the client may be implemented by a bandwidth monitoring device, or may be separately performed by a data acquisition device and a data storage device in the CDN system. The specific scenario architecture of the CDN system may be as shown in FIG. 1. The bandwidth monitoring device may include a processor, a memory, and a transceiver. The processor may be used to perform the monitoring of bandwidth condition in the following process, the memory may be used to store the data required and the data generated during the following process, and the transceiver may be used to receive and transmit related data during the following process. The monitoring of bandwidth condition and the processing of the collection and the storage of the bandwidth data may both be implemented by a distributed system disposed inside the CDN system. In one embodiment, "the monitoring of bandwidth condition and the processing of the collection and the storage of the bandwidth data are both performed by a bandwidth monitoring device" is used as an example for illustration. Other situations are similar to that, and the details will not be described again.

Figure 2:
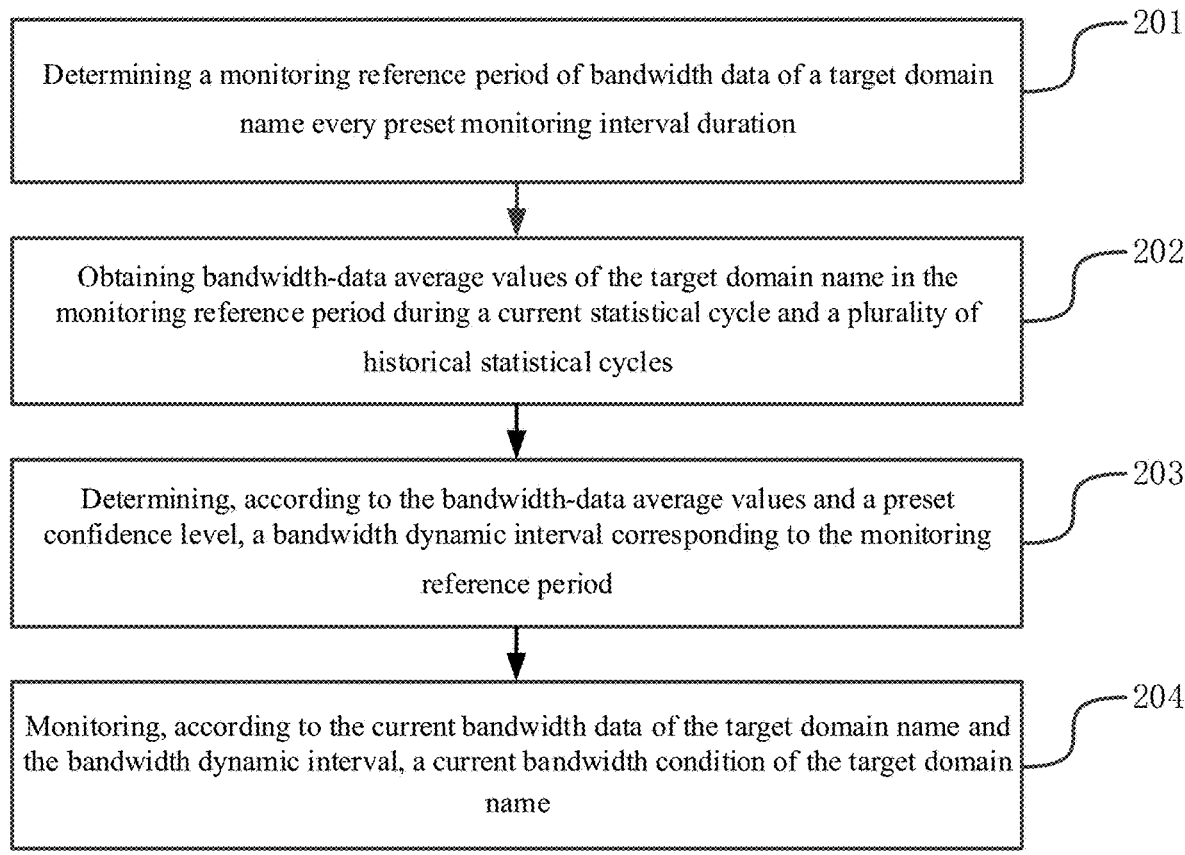
FIG. 2 illustrates a flowchart of a method for monitoring bandwidth condition according to an embodiment of the present disclosure.

In the following, the processing flow shown in FIG. 2 will be described in detail with reference to specific implementations, and the content may be as follows.

In step 201, a monitoring reference period of the bandwidth data of the target domain name may be determined every preset monitoring interval duration.

In one embodiment, a target domain name may be taken as an example. During the process of monitoring the bandwidth condition of the target domain name, the bandwidth monitoring device may monitor the bandwidth condition of the target domain name once every preset monitoring interval duration. Specifically, each time when performing monitoring, the bandwidth monitoring device may first determine a monitoring reference period of the bandwidth data of the target domain name. Here, the monitoring reference period may be a time period covered by all bandwidth data that need to be referenced when monitoring the bandwidth condition. The monitoring interval duration and the monitoring reference period may be set by a technical staff of the CDN system according to the bandwidth monitoring requirements. The monitoring interval duration may be 1 minute, that is, the bandwidth condition of the target domain name may be monitored once every minute. The monitoring reference period may be 30 minutes ahead of the current time, that is, the bandwidth data in the previous 30 minutes may need to be referenced for each time of monitoring.

In step 202, the bandwidth-data average values of the target domain name in the monitoring reference period during a current statistical cycle and a plurality of historical statistical cycles may be obtained.

In one embodiment, when monitoring the bandwidth condition is started, the bandwidth monitoring device may determine the statistical cycle to which the current time belongs (i.e., the current statistical cycle), and a plurality of historical statistical cycles before the current statistical cycle. Then, after determining the monitoring reference period, the bandwidth-data average values of the target domain name in the monitoring reference period and in the plurality of historical statistical cycles may be obtained. The statistical cycle here may be preset by a technical staff of the CDN system, and one statistical cycle may be one day or one week. It is worth mentioning that, in a case where the monitoring reference period extends across statistical cycles, the monitoring reference period may be considered as belonging to the latter statistical cycle. For example, when the monitoring reference period is 30 minutes and the statistical cycle is 1 day, the monitoring reference period determined before 00:30 of January $2^{nd}$ may extend across two statistical cycles including January $1^{st}$ and January $2^{nd}$. The monitoring reference period may still be regarded as the monitoring reference period of January $2^{nd}$, and the method for monitoring bandwidth condition disclosed in the embodiment may also be applicable.

Optionally, the bandwidth monitoring device may be able to reduce the calculation amount each time when the bandwidth condition is monitored through the process of buffering the bandwidth-data average values. Correspondingly, processing step 202 may be as follows: obtaining the real-time bandwidth data of the target domain name at each specified collection time in the monitoring reference period during the current statistical cycle; calculating and storing, according to the real-time bandwidth data, a bandwidth-data average value of the target domain name in the monitoring reference period; and obtaining the pre-stored bandwidth-data average values of the target domain name in the monitoring reference period during the plurality of historical statistical cycles.

In one embodiment, the bandwidth monitoring device may be disposed at the interface between business servers corresponding to the target domain name and the CND system, and may collect the real-time bandwidth data of the target domain name at specified collection times and may store the collected real-time bandwidth data locally. As such, after determining the monitoring reference period, the bandwidth monitoring device may only obtain the real-time bandwidth data of the target domain name at each specified collection time in the monitoring reference period during the current statistical cycle, and then according to the bandwidth-data average values, the bandwidth-data average value of the target domain name in the monitoring reference period may be calculated, and the bandwidth-data average value may be stored locally. It should be understood that, for the bandwidth-data average values of the target domain name in the monitoring reference period and in all historical statistical cycles, the bandwidth monitoring device may complete the calculation and local storage during the monitoring process in the historical statistical cycles. Therefore, at this time, the bandwidth monitoring device may not need to calculate again, and the pre-stored bandwidth-data average values of the target domain name in the monitoring reference period during a plurality of historical statistical cycles may be directly obtained from the local.

Optionally, when calculating the bandwidth-data average value, the abnormal values in the real-time bandwidth data may be removed using a Gaussian function method, and the corresponding process may be as follows: the bandwidth-data average value and the bandwidth-data standard deviation of the target domain name in the monitoring reference period may be calculated according to the real-time bandwidth data; the bandwidth fluctuation range of the target domain name may be determined according to the bandwidth-data average value, the bandwidth-data standard deviation, and the preset bandwidth fluctuation weight; the real-time bandwidth data that have a value outside the bandwidth fluctuation range may be removed from the real-time bandwidth data of the target domain name in the monitoring reference period; and the bandwidth-data average value of the target domain name in the monitoring reference period may be recalculated and stored according to the remaining real-time bandwidth data after the removal.

In one embodiment, the bandwidth monitoring device may be able to calculate the bandwidth-data average value and the bandwidth-data standard deviation of the target domain name in the monitoring reference period according to the real-time bandwidth data of the target domain name in the monitoring reference period during the current statistical cycle, and then determine the bandwidth fluctuation range of the target domain name according to the bandwidth-data average value, the bandwidth-data standard deviation, and the preset bandwidth fluctuation weight. Further, the bandwidth monitoring device may be able to remove the real-time bandwidth data that have a value outside the bandwidth fluctuation range from the real-time bandwidth data of the target domain name in the monitoring reference period. In addition, the bandwidth monitoring device may recalculate the bandwidth-data average value of the target domain name in the monitoring reference period according to the remaining real-time bandwidth data after the removal, and store the calculated bandwidth-data average value locally. Specifically, for n real-time bandwidth data having values $x_{1-1}, x_{1-2}, \ldots,$ and $x_{1-n}$, respectively, the bandwidth-data average value of the n real-time bandwidth data obtained through calculation may be $\overline{x_1}(n)$, and the standard deviation may be $\sigma_{x1}(n)$. The preset bandwidth fluctuation weight may be $\varepsilon_1$, and the bandwidth fluctuation range may be:

$$[\overline{x_1}(n)-\varepsilon_1*\sigma_{x1}(n), \overline{x_1}(n)+\varepsilon_1*\sigma_{x1}(n)].$$

Moreover, in the n real-time bandwidth data, there may be j real-time bandwidth data having a value outside the bandwidth fluctuation range, and then the bandwidth-data average value of the remaining n-j real-time bandwidth data after the removal may be calculated to be $\sigma_{x1}$ (n−j).

Optionally, real-time bandwidth data at different times may have different degrees of influence on the current bandwidth data. Correspondingly, the process of calculating the bandwidth-data average value may be as follows: according to the remaining real-time bandwidth data after the removal and the preset time weight corresponding to each of the real-time bandwidth data, the bandwidth-data average value of the target domain name in the monitoring reference period may be recalculated.

In one embodiment, after removing the abnormal real-time bandwidth data using a Gaussian function method, the bandwidth monitoring device may acquire the preset time weight corresponding to each real-time bandwidth data. The preset time weight may be set by a technical staff of the CDN system according to experience, and may be used to describe the impact of the real-time bandwidth data at different times on monitoring the current bandwidth condition. It can be understood that the preset time weight of the real-time bandwidth data that is closer to the current time may be higher. As such, when recalculating the bandwidth-data average value, the bandwidth monitoring device may be able to multiply each remaining real-time bandwidth data after the removal by its corresponding preset time weight, and add all the multiplications together and obtain the average value, such that the bandwidth-data average value of the target domain name in the monitoring reference period may be obtained and the bandwidth-data average value may be stored.

Optionally, considering that the bandwidth usage of the statistical cycles with different cycle types may be very different, statistical cycles of a same cycle type may be referenced when monitoring the bandwidth condition. Therefore, the following process may be performed prior to step 202: a plurality of historical statistical cycles that have a cycle type the same as the cycle type of the current statistical cycle and are also the closest to the current statistical cycle may be determined.

In one embodiment, a technical staff of the CDN system may divide the statistical cycles into multiple cycle types according to the bandwidth usage situation of the domain name. The bandwidth usage situations in all statistical cycles of each cycle type should roughly follow a same pattern, and the bandwidth usage situations in statistical cycles with different cycle types may be substantially different. For example, when the unit statistical cycle is one day, the statistical cycles may be divided into holidays and workdays, or the statistical cycles may be divided into early-month dates, middle-month dates, and late-month dates. The statistical cycles can also be divided into service update dates, service maintenance dates, and normal service dates, etc. A single statistical cycle may have multiple cycle types under different classification criteria. For example, January $25^{th}$ can be both a weekday, a middle-month date, and a service update date. As such, after determining the current statistical cycle, the bandwidth monitoring device may be able to determine the cycle type of the current statistical cycle, and then determine a plurality of historical statistical cycles that have a cycle type the same as the cycle type of the current statistical cycle and are also the closest to the current statistical cycle. It should be noted that, when determining the historical statistical cycles, the consistency of all cycle types and the distance from the current statistical cycle may be weighed according to demands. For example, 5 most recent historical statistical cycles in the last three months with a cycle-type similarity not only the highest but greater than 90% may be determined. Alternatively, 5 most recent historical statistical cycles in the last month with a cycle-type similarity not only the highest but greater than 60% may be determined.

In step 203, according to the bandwidth-data average value and a preset confidence level, the bandwidth dynamic interval corresponding to the monitoring reference period may be determined.

In one embodiment, after obtaining the bandwidth-data average value of the target domain name in the monitoring reference period during the plurality of statistical cycles, the bandwidth monitoring device may determine the bandwidth dynamic interval corresponding to the monitoring reference period according to the bandwidth-data average value and a preset confidence level. Specifically, the number of the historical statistical cycles may be m−1, and thus the bandwidth-data average values may have a total number of m. The values may be $\bar{x}_2, \ldots,$ and respectively. The average value of the m bandwidth-data average values obtained through calculation may be $\bar{\bar{x}}$, and the standard deviation may be $\sigma_{\bar{x}}$. The preset confidence level may be 1−α, and then the bandwidth dynamic interval may be:

$$\left[\bar{\bar{x}} - z_{1-\alpha/2} * \frac{\sigma_{\bar{x}}}{\sqrt{m}}, \bar{\bar{x}} + z_{1-\alpha/2} * \frac{\sigma_{\bar{x}}}{\sqrt{m}}\right].$$

Figure 3:
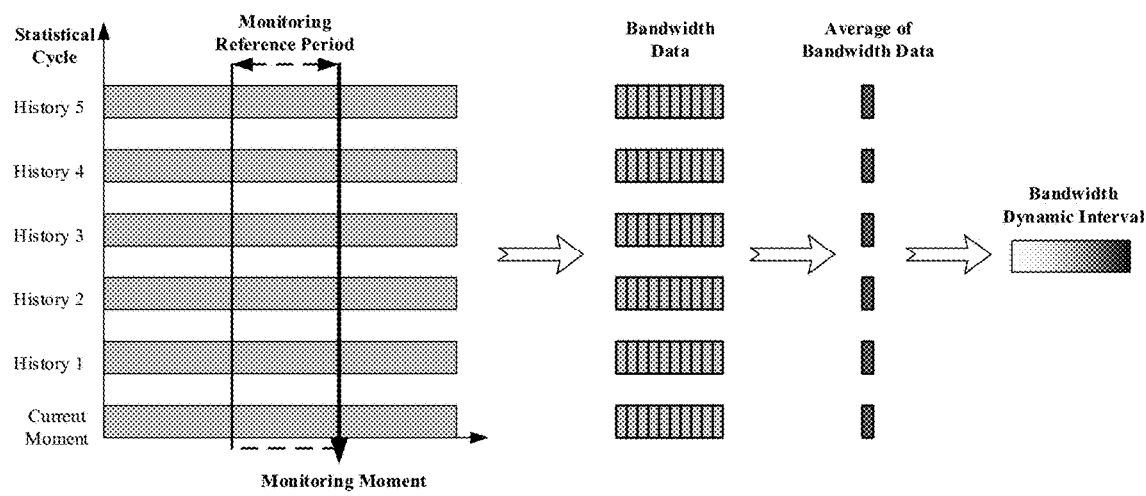
FIG. 3 illustrates a schematic diagram of a logic principle of determining a bandwidth dynamic interval according to an embodiment of the present disclosure.

The logic principle of determining the bandwidth dynamic interval in steps 201 to 203 described above may be referred to FIG. 3. At a monitoring moment, the bandwidth data in the monitoring reference period during the current statistical cycle and the 5 historical statistical cycles may be selected, and then the bandwidth-data average value of 10 bandwidth data in each statistical cycle may be calculated, and the bandwidth-data average value of the 6 statistical cycles may be further calculated to determine the bandwidth dynamic interval.

Optionally, when determining the bandwidth dynamic interval, the abnormal values may be removed from all bandwidth-data average values using a Gaussian function method. Correspondingly, the process of step 203 may be as follows: the average value and the standard deviation of a plurality of bandwidth-data average values of the target domain name corresponding to the current statistical cycle and the plurality of historical statistical cycles may be calculated; the fluctuation range of the average value of the target domain name may be determined according to the average value and the standard deviation of the plurality of bandwidth-data average values and the preset average-value fluctuation weight; the bandwidth-data average values outside the fluctuation range of the average value may be removed from the plurality of bandwidth-data average values in the monitoring reference period; and the bandwidth dynamic interval corresponding to the monitoring reference period may be determined according to remaining bandwidth-data average values after the removal and a preset confidence level.

In one embodiment, in the process of determining the bandwidth dynamic interval of the current time, the bandwidth monitoring device may first calculate the average value and the standard deviation of the plurality of bandwidth-data average values obtained through the calculation in step 202, and then determine the fluctuation range of the average value of the target domain name according to the average value and the standard deviation of the plurality of bandwidth-data average values and the preset average-value fluctuation weight. Then, the bandwidth monitoring device may remove the bandwidth-data average values outside the fluctuation range of the average value from the plurality of bandwidth-data average values in the monitoring reference period. Further, the bandwidth monitoring device may determine the bandwidth dynamic interval corresponding to the monitoring reference period according to the remaining bandwidth-data average values after the removal and the preset confidence level. Specifically, form bandwidth-data average values: $\bar{x}_1, \bar{x}_2, \ldots, \bar{x}_m$, the average value of the m bandwidth-data average values obtained through calculation may be $\bar{x}(m)$, and the standard deviation may be $\sigma_{\bar{x}}(m)$. The preset average-value fluctuation weight may be $\varepsilon_2$, and the fluctuation range of the average value may be:

$$[\bar{x}(m) - \varepsilon_2 * \sigma_{\bar{x}}(m), \bar{x}(m) + \varepsilon_2 * \sigma_{\bar{x}}(m)].$$

Moreover, in the m bandwidth-data average values, there may be i bandwidth-data average values outside the fluctuation range of the average value, and then the average value of the remaining m−i bandwidth-data average values after the removal may be calculated to be $\sigma_{\bar{x}}(m-i)$. The preset confidence level may be 1−α, and then the bandwidth dynamic interval may be:

$$\left[\bar{x}(m-i) - z_{1-\alpha/2} * \frac{\sigma_{\bar{x}}(m-i)}{\sqrt{m-i}}, \bar{x}(m-i) + z_{1-\alpha/2} * \frac{\sigma_{\bar{x}}(m-i)}{\sqrt{m-i}}\right].$$

Optionally, the bandwidth-data average value of different statistical cycles may have different degrees of influence on the bandwidth dynamic interval. Correspondingly, the process of determining the bandwidth dynamic interval may be as follows: the bandwidth dynamic interval corresponding to the monitoring reference period may be determined according to the remaining bandwidth-data average values after the removal, the preset cycle weight corresponding to each bandwidth-data average value, and the preset confidence level.

In one embodiment, after removing the abnormal bandwidth-data average values using a Gaussian function method, the bandwidth monitoring device may acquire the preset cycle weight corresponding to each bandwidth-data average value. The preset cycle weight may be set by a technical staff of the CDN system according to experience, and may be used to describe the impact of the bandwidth-data average values of different statistical cycles on monitoring the current bandwidth condition. It can be understood that the preset cycle weight of a statistical cycle that is closer to the current statistical cycle may be higher. As such, when calculating the bandwidth dynamic region, the bandwidth monitoring device may be able to determine the bandwidth dynamic region corresponding to the monitoring reference period according to the remaining bandwidth-data average values after the removal, the preset cycle weight corresponding to each bandwidth-data average value, and the preset confidence level. An example of using the preset period weight is provided here for illustration: the bandwidth monitoring device may, according to the preset cycle weight corresponding to each bandwidth-data average value, make multiple copies of the corresponding bandwidth-data average values, and may then use all bandwidth-data average values after replication to determine the corresponding bandwidth dynamic interval.

In step 204, the current bandwidth condition of the target domain name may be monitored according to the current bandwidth data of the target domain name and the bandwidth dynamic region.

In one embodiment, after determining the bandwidth dynamic region corresponding to the monitoring reference period, the bandwidth monitoring device may determine whether the current bandwidth data of the target domain name is located in the bandwidth dynamic interval. When the current bandwidth data of the target domain name is located in the bandwidth dynamic interval, the bandwidth monitoring device may consider the bandwidth condition of the target domain name as normal; when the current bandwidth data of the target domain name is not located in the bandwidth dynamic interval, the bandwidth monitoring device may consider the bandwidth condition of the target domain name as abnormal, and further, a subsequent bandwidth anomaly alarm or a preset anomaly-handling process may be triggered.

According to the embodiments of the present disclosure, a monitoring reference period of the bandwidth data of a target domain name may be determined every preset monitoring interval duration; the average bandwidth-data values of the target domain name in the monitoring reference period during a current statistical cycle and a plurality of historical statistical cycles may be obtained; a bandwidth dynamic interval corresponding to the monitoring reference period may be determined according to the average bandwidth-data values and a preset confidence level; the current bandwidth condition of the target domain name may be monitored according to the current bandwidth data of the target domain name and the bandwidth dynamic interval. As such, when monitoring bandwidth condition, by analyzing the historical bandwidth data, a reasonable bandwidth dynamic interval is determined, such that before an abnormal bandwidth condition is accumulated to affect the service quality, the abnormal bandwidth condition can be detected in time through the bandwidth dynamic interval, and a subsequent alarm or repair process can be triggered, which is conducive to repairing the abnormal condition before the service provider detects the bandwidth anomaly, and thus ensures the overall service quality for the client.

Figure 4:
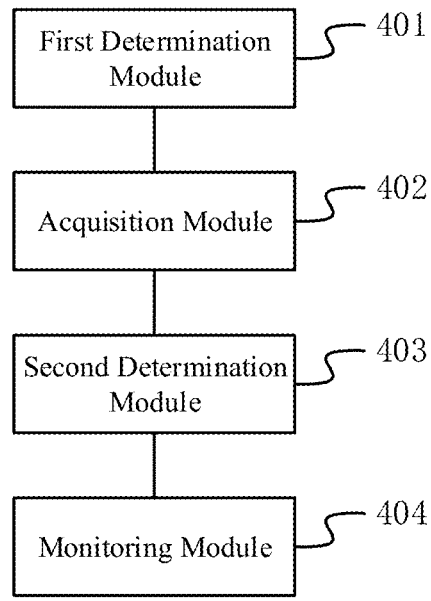
FIG. 4 illustrates a schematic structural diagram of an apparatus for monitoring bandwidth condition according to an embodiment of the present disclosure.

The embodiments of the present disclosure further provide an apparatus for monitoring bandwidth condition based on the same technical concept. As shown in FIG. 4, the apparatus may include:

a first determination module 401, configured to determine a monitoring reference period of the bandwidth data of a target domain name every preset monitoring interval duration;

an acquisition module 402, configured to obtain bandwidth-data average values of the target domain name in the monitoring reference period during a current statistical cycle and a plurality of historical statistical cycles;

a second determination module 403, configured to determine, according to the bandwidth-data average values and a preset confidence level, a bandwidth dynamic interval corresponding to the monitoring reference period; and a monitoring module 404, configured to monitor, according to the current bandwidth data of the target domain name and the bandwidth dynamic interval, a current bandwidth condition of the target domain name.

Optionally, the acquisition module 402 may be specifically configured to:

obtain real-time bandwidth data of the target domain name at each specified collection time in the monitoring reference period during the current statistical cycle;

calculate and store, according to the real-time bandwidth data, a bandwidth-data average value of the target domain name in the monitoring reference period; and obtain pre-stored bandwidth-data average values of the target domain name in the monitoring reference period during the plurality of historical statistical cycles.

Optionally, the acquisition module 402 may be specifically configured to:

calculate, according to the real-time bandwidth data, the bandwidth-data average value and the bandwidth-data standard deviation of the target domain name in the monitoring reference period;

determine, according to the bandwidth-data average value, the bandwidth-data standard deviation, and a preset bandwidth fluctuation weight, a bandwidth fluctuation range of the target domain name;

remove, from the real-time bandwidth data of the target domain name in the monitoring reference period, real-time bandwidth data having a value outside the bandwidth fluctuation range; and recalculate and store, according to remaining real-time bandwidth data after the removal, a bandwidth-data average value of the target domain name in the monitoring reference period.

Optionally, the acquisition module 402 may be further configured to:

recalculate and store, according to the remaining real-time bandwidth data after the removal and a preset time weight corresponding to each of the real-time bandwidth data, the bandwidth-data average value of the target domain name in the monitoring reference period.

Optionally, the second determination module 403 may be specifically configured to:

calculate an average value and a standard deviation of a plurality of bandwidth-data average values of the target domain name corresponding to the current statistical cycle and the plurality of historical statistical cycles;

determine, according to the average value and the standard deviation of the plurality of bandwidth-data average values and a preset average-value fluctuation weight, a fluctuation range of the average value of the target domain name;

remove, from the plurality of bandwidth-data average values in the monitoring reference period, bandwidth-data average values outside the fluctuation range of the average value; and determine, according to remaining bandwidth-data average values after the removal and the preset confidence level, the bandwidth dynamic interval corresponding to the monitoring reference period.

Optionally, the second determination module 403 may be specifically configured to:

determine, according to the remaining bandwidth-data average values after the removal, a preset cycle weight corresponding to each bandwidth-data average value, and the preset confidence level, the bandwidth dynamic interval corresponding to the monitoring reference period.

Figure 5:
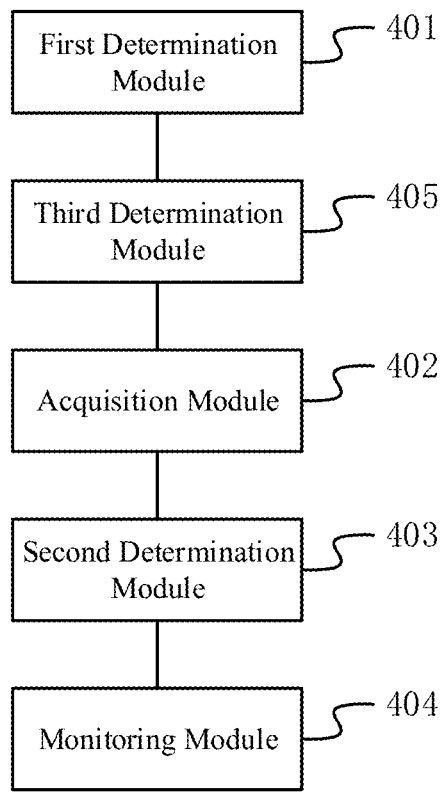
FIG. 5 illustrates a schematic structural diagram of an apparatus for monitoring bandwidth condition according to an embodiment of the present disclosure.

Optionally, as shown in FIG. 5, the apparatus may further include a third determination module 405, configured to:

determine a plurality of historical statistical cycles that have a cycle type the same as the cycle type of the current statistical cycle and are also the closest to the current statistical cycle.

According to the embodiments of the present disclosure, a monitoring reference period of the bandwidth data of a target domain name may be determined every preset monitoring interval duration; the average bandwidth-data values of the target domain name in the monitoring reference period during a current statistical cycle and a plurality of historical statistical cycles may be obtained; a bandwidth dynamic interval corresponding to the monitoring reference period may be determined according to the average bandwidth-data values and a preset confidence level; the current bandwidth condition of the target domain name may be monitored according to the current bandwidth data of the target domain name and the bandwidth dynamic interval. As such, when monitoring bandwidth condition, by analyzing the historical bandwidth data, a reasonable bandwidth dynamic interval is determined, such that before an abnormal bandwidth condition is accumulated to affect the service quality, the abnormal bandwidth condition can be detected in time through the bandwidth dynamic interval, and a subsequent alarm or repair process can be triggered, which is conducive to repairing the abnormal condition before the service provider detects the bandwidth anomaly, and thus ensures the overall service quality for the client.

It should be noted that, when monitoring the bandwidth condition, the apparatus for monitoring bandwidth condition provided by the embodiments described above is only illustrated, as an example, by the division of the above functional modules. In actual applications, according to needs, the above functions may be assigned to different functions for implementation. That is, the internal structure of the apparatus may be divided into different functional modules to implement all or part of the functions described above. In addition, the apparatus for monitoring bandwidth condition provided by the above embodiments is based on the same concept as the embodiments of the method for monitoring bandwidth condition, and the specific implementation process is described in detail in the method embodiments, which are not repeated here.

Figure 6:
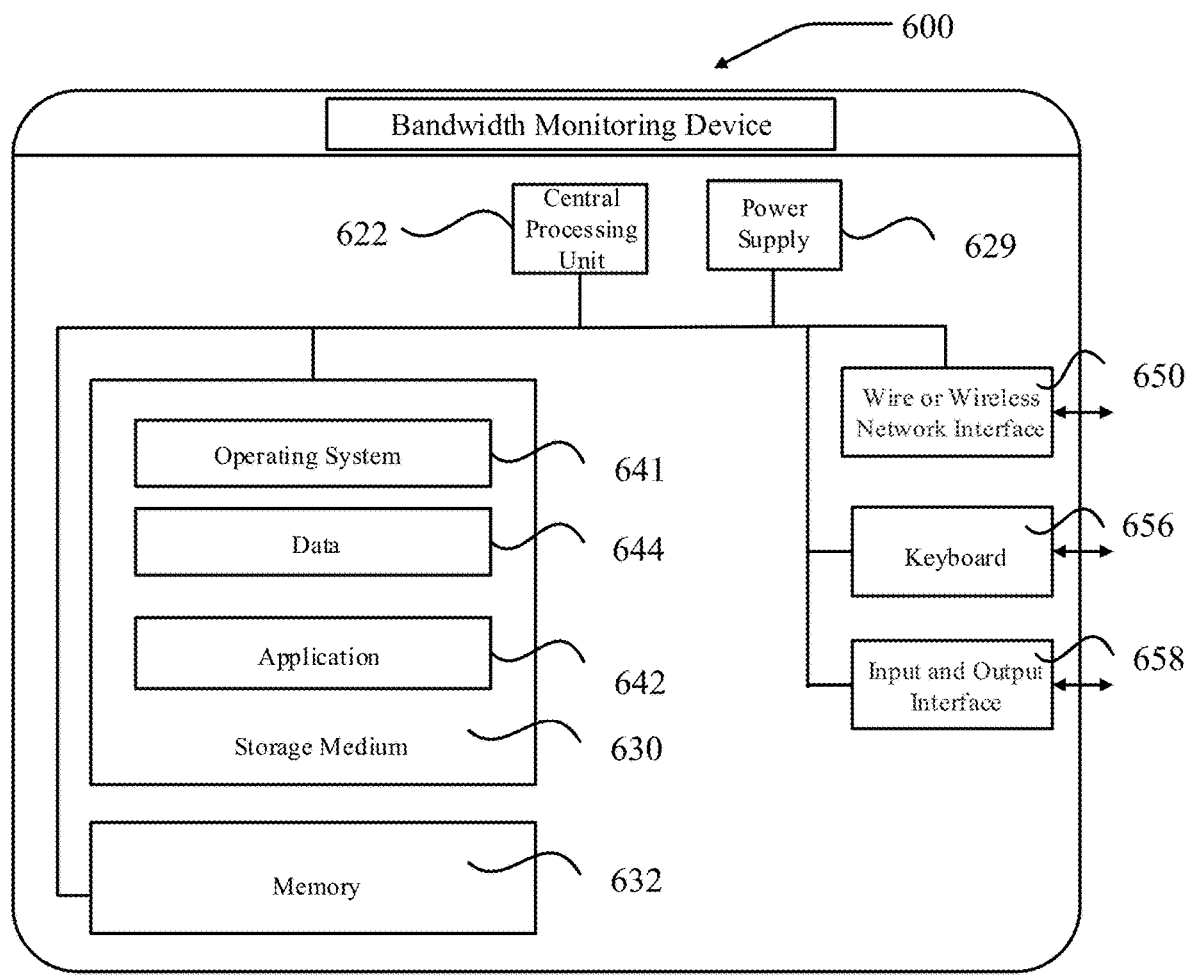
FIG. 6 illustrates a schematic structural diagram of a bandwidth monitoring device according to an embodiment of the present disclosure.

FIG. 6 illustrates a schematic structural diagram of a bandwidth monitoring device according to an embodiment of the present disclosure. The bandwidth monitoring device 600 may have relatively large variations due to different configurations or performances, and may include one or more than one central processing unit (CPU) 622 (e.g., one or more than one processor), a memory 632, and one or more than one storage medium 630 (e.g., one or more than one mass storage device) for storing application 642 or data 644. In the bandwidth monitoring device 600, the memory 632 and the storage medium 630 may be short-term storage or persistent storage. The application stored in the storage medium 630 may include one or more than one module (not shown in the figure), and each module may include a series of instruction operations in the bandwidth monitoring device 600. Further, the CPU 622 may be configured to communicate with the storage device 630 to perform a series of instruction operations in the storage medium on the bandwidth monitoring device 600.

The bandwidth monitoring device 600 may further include one or more than one power supply 629, one or more than one wire or wireless network interface 650, one or more than one input and output interface 658, one or more than one keyboard 656, and/or one or more than one operating system 641, such as Windows server, Mac OS X, Unix, Linux, FreeBSD, etc.

The bandwidth monitoring device 600 may include a memory, and one or more program. The one or more than one program may be stored in the memory, and may be configured such that the instructions included in the one or more than one program for performing the monitoring of bandwidth condition can be executed by one or more than one processor.

Those skilled in the art shall understand that the implementation of all or part of the steps of the above embodiments may be completed by hardware, or may be completed by using a program to instruct related hardware. The program may be stored in a computer readable storage medium. The storage medium mentioned above may be a read only memory, a magnetic disk or optical disk, etc.

The above are only the preferred embodiments of the present disclosure, and are not intended to limit the present disclosure. Any modifications, equivalents, improvements, etc., that are within the spirit and scope of the present disclosure, shall be included in the scope of protection of the present disclosure.

What is claimed is:

1. A method for monitoring bandwidth condition, comprising:

determining a monitoring reference period of bandwidth data of a target domain name every preset monitoring interval duration;

obtaining bandwidth-data average values of the target domain name in the monitoring reference period during a current statistical cycle and a plurality of historical statistical cycles;

determining, according to the bandwidth-data average values and a preset confidence level, a bandwidth dynamic interval corresponding to the monitoring reference period; and monitoring, according to current bandwidth data of the target domain name and the bandwidth dynamic interval, a current bandwidth condition of the target domain name;

wherein obtaining the bandwidth-data average values of the target domain name in the monitoring reference period during the current statistical cycle and the plurality of historical statistical cycles includes:
- obtaining real-time bandwidth data of the target domain name at each specified collection time in the monitoring reference period during the current statistical cycle;
- calculating and storing, according to the real-time bandwidth data, a bandwidth-data average value of the target domain name in the monitoring reference period; and
- obtaining pre-stored bandwidth-data average values of the target domain name in the monitoring reference period during the plurality of historical statistical cycles;
- wherein calculating and storing, according to the real-time bandwidth data, the bandwidth-data average value of the target domain name in the monitoring reference period includes:
- calculating, according to the real-time bandwidth data, the bandwidth-data average value and a bandwidth-data standard deviation of the target domain name in the monitoring reference period;
- determining, according to the bandwidth-data average value, the bandwidth-data standard deviation, and a preset bandwidth fluctuation weight, a bandwidth fluctuation range of the target domain name;
- removing, from the real-time bandwidth data of the target domain name in the monitoring reference period, real-time bandwidth data having a value outside the bandwidth fluctuation range; and
- recalculating and storing, according to remaining real-time bandwidth data after removal, the bandwidth-data average value of the target domain name in the monitoring reference period.

2. The method according to claim 1, wherein recalculating and storing, according to the remaining real-time bandwidth data after the removal, the bandwidth-data average value of the target domain name in the monitoring reference period further includes:
- recalculating and storing, according to the remaining real-time bandwidth data after the removal and a preset time weight corresponding to each of the real-time bandwidth data, the bandwidth-data average value of the target domain name in the monitoring reference period.

3. The method according to claim 1, wherein determining, according to the bandwidth-data average values and the preset confidence level, the bandwidth dynamic interval corresponding to the monitoring reference period includes:
- calculating an average value and a standard deviation of a plurality of bandwidth-data average values of the target domain name corresponding to the current statistical cycle and the plurality of historical statistical cycles;
- determining, according to the average value and the standard deviation of the plurality of bandwidth-data average values and a preset average-value fluctuation weight, a fluctuation range of the average value of the target domain name;
- removing, from the plurality of bandwidth-data average values in the monitoring reference period, bandwidth-data average values outside the fluctuation range of the average value; and
- determining, according to remaining bandwidth-data average values after removal and the preset confidence level, the bandwidth dynamic interval corresponding to the monitoring reference period.

4. The method according to claim 3, wherein determining, according to the remaining bandwidth-data average values after the removal and the preset confidence level, the bandwidth dynamic interval corresponding to the monitoring reference period includes:
- determining, according to the remaining bandwidth-data average values after the removal, a preset cycle weight corresponding to each bandwidth-data average value of the plurality of bandwidth-data average values, and the preset confidence level, the bandwidth dynamic interval corresponding to the monitoring reference period.

5. The method according to claim 1, prior to obtaining the bandwidth-data average values of the target domain name in the monitoring reference period during the current statistical cycle and the plurality of historical statistical cycles, further including:
- determining a plurality of historical statistical cycles that have a cycle type same as a cycle type of the current statistical cycle and are also closest to the current statistical cycle.

6. The method according to claim 1, further including:
- according to a preset cycle weight corresponding to each bandwidth-data average value, making multiple copies of corresponding bandwidth-data average values, and using all bandwidth-data average values after replication to determine corresponding bandwidth dynamic interval.

7. The method according to claim 1, further including:
- determining whether the current bandwidth data of the target domain name is located in the bandwidth dynamic interval;
- when the current bandwidth data of the target domain name is located in the bandwidth dynamic interval, determining the bandwidth condition of the target domain name as normal; and when the current bandwidth data of the target domain name is not located in the bandwidth dynamic interval, determining the bandwidth condition of the target domain name as abnormal.

8. A bandwidth monitoring device, comprising a processor, wherein the processor is configured to:
- determine a monitoring reference period of bandwidth data of a target domain name every preset monitoring interval duration;
- obtain bandwidth-data average values of the target domain name in the monitoring reference period during a current statistical cycle and a plurality of historical statistical cycles;
- determine, according to the bandwidth-data average values and a preset confidence level, a bandwidth dynamic interval corresponding to the monitoring reference period; and
- monitor, according to the current bandwidth data of the target domain name and the bandwidth dynamic interval, a current bandwidth condition of the target domain name;
- wherein the processor is further configured to:
- obtain real-time bandwidth data of the target domain name at each specified collection time in the monitoring reference period during the current statistical cycle;
- calculate and store, according to the real-time bandwidth data, a bandwidth-data average value of the target domain name in the monitoring reference period; and obtain pre-stored bandwidth-data average values of the target domain name in the monitoring reference period during the plurality of historical statistical cycles;

wherein the processor is further configured to:

calculate, according to the real-time bandwidth data, the bandwidth-data average value and a bandwidth-data standard deviation of the target domain name in the monitoring reference period;

determine, according to the bandwidth-data average value, the bandwidth-data standard deviation, and a preset bandwidth fluctuation weight, a bandwidth fluctuation range of the target domain name;

remove, from the real-time bandwidth data of the target domain name in the monitoring reference period, real-time bandwidth data having a value outside the bandwidth fluctuation range; and recalculate and store, according to remaining real-time bandwidth data after removal, the bandwidth-data average value of the target domain name in the monitoring reference period.

9. The device according to claim 8, wherein the processor is further configured to:

recalculate and store, according to the remaining real-time bandwidth data after the removal and a preset time weight corresponding to each of the real-time bandwidth data, the bandwidth-data average value of the target domain name in the monitoring reference period.

10. The device according to claim 8, wherein the processor is configured to:

calculate an average value and a standard deviation of a plurality of bandwidth-data average values of the target domain name corresponding to the current statistical cycle and the plurality of historical statistical cycles;

determine, according to the average value and the standard deviation of the plurality of bandwidth-data average values as well as a preset average-value fluctuation weight, a fluctuation range of the average value of the target domain name;

remove, from the plurality of bandwidth-data average values of the monitoring reference period, bandwidth-data average values outside the fluctuation range of the average value; and determine, according to remaining bandwidth-data average values after removal and the preset confidence level, the bandwidth dynamic interval corresponding to the monitoring reference period.

11. The device according to claim 10, wherein the processor is configured to:

determine, according to the remaining bandwidth-data average values after the removal, a preset cycle weight corresponding to each bandwidth-data average value of the plurality of bandwidth-data average values, and the preset confidence level, the bandwidth dynamic interval corresponding to the monitoring reference period.

12. The device according to claim 8, wherein the processor is further configured to:

determine a plurality of historical statistical cycles that have a cycle type same as a cycle type of the current statistical cycle and are also closest to the current statistical cycle.

13. A bandwidth monitoring device, comprising a processor and a memory, wherein at least one instruction, at least one program, a code collection, or an instruction collection is stored in the memory; and the at least one instruction, the at least one program, the code collection, or the instruction collection is loaded and executed by the processor to implement a method for monitoring bandwidth condition, the method comprising:

determining a monitoring reference period of bandwidth data of a target domain name every preset monitoring interval duration;

obtaining bandwidth-data average values of the target domain name in the monitoring reference period during a current statistical cycle and a plurality of historical statistical cycles;

determining, according to the bandwidth-data average values and a preset confidence level, a bandwidth dynamic interval corresponding to the monitoring reference period; and monitoring, according to current bandwidth data of the target domain name and the bandwidth dynamic interval, a current bandwidth condition of the target domain name;

wherein obtaining the bandwidth-data average values of the target domain name in the monitoring reference period during the current statistical cycle and the plurality of historical statistical cycles includes:

obtaining real-time bandwidth data of the target domain name at each specified collection time in the monitoring reference period during the current statistical cycle;

calculating and storing, according to the real-time bandwidth data, a bandwidth-data average value of the target domain name in the monitoring reference period; and obtaining pre-stored bandwidth-data average values of the target domain name in the monitoring reference period during the plurality of historical statistical cycles;

wherein calculating and storing, according to the real-time bandwidth data, the bandwidth-data average value of the target domain name in the monitoring reference period includes:

calculating, according to the real-time bandwidth data, the bandwidth-data average value and a bandwidth-data standard deviation of the target domain name in the monitoring reference period;

determining, according to the bandwidth-data average value, the bandwidth-data standard deviation, and a preset bandwidth fluctuation weight, a bandwidth fluctuation range of the target domain name;

removing, from the real-time bandwidth data of the target domain name in the monitoring reference period, real-time bandwidth data having a value outside the bandwidth fluctuation range; and recalculating and storing, according to remaining real-time bandwidth data after removal, the bandwidth-data average value of the target domain name in the monitoring reference period.

* * * * *